(12) United States Patent
Fransen et al.

(10) Patent No.: US 7,604,295 B2
(45) Date of Patent: Oct. 20, 2009

(54) CHILD VEHICLE SEAT

(75) Inventors: Martinus Theodorus Fransen, Geldrop (NL); Roelof Van Driel, Eindhoven (NL)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 11/944,992

(22) Filed: Nov. 26, 2007

(65) Prior Publication Data

US 2008/0122276 A1    May 29, 2008

(30) Foreign Application Priority Data

Nov. 28, 2006    (NL) .................................... 1032957

(51) Int. Cl.
*A47D 1/10* (2006.01)
(52) U.S. Cl. ................................. 297/256.13
(58) Field of Classification Search ............ 297/256.13, 297/250.1, 256.1
See application file for complete search history.

(56) References Cited

U.S. PATENT DOCUMENTS

| 3,404,917 | A | * | 10/1968 | Smith ....................... 297/256.1 |
| 4,047,755 | A | | 9/1977 | McDonald et al. |
| 5,181,761 | A | | 1/1993 | Meeker |
| 5,746,478 | A | * | 5/1998 | Lumley et al. ......... 297/256.13 |
| 6,419,312 | B1 | * | 7/2002 | Flannery et al. ............. 297/149 |
| 6,428,099 | B1 | * | 8/2002 | Kain ....................... 297/256.1 |
| 6,568,755 | B1 | * | 5/2003 | Groening ............... 297/256.13 |
| 7,086,695 | B2 | * | 8/2006 | Hosoya ................. 297/256.16 |

FOREIGN PATENT DOCUMENTS

| DE | 2128927 | | 12/1972 |
| EP | 1470952 | | 10/2004 |
| EP | 1477358 | | 11/2004 |
| EP | 1574387 | | 9/2005 |
| EP | 1593545 | | 11/2005 |
| FR | 2680734 | A1 * | 3/1993 |
| WO | 2006061507 | | 6/2006 |

OTHER PUBLICATIONS

International Search Report, Netherlands Application 1032957, dated Jul. 30, 2007.

* cited by examiner

*Primary Examiner*—Milton Nelson, Jr.
(74) *Attorney, Agent, or Firm*—Barnes & Thornburg LLP

(57) ABSTRACT

A child vehicle seat includes a seat portion and a chassis to support the seat portion. A backrest is connected to the seat portion. A pivot connects the backrest to the seat portion to permit the backrest to be pivotally adjusted with respect to the seat portion. At least one element is included on one of the seat portion or the chassis. At least one recess is defined in one of the chassis or the seat portion. The at least one element engages the at least one recess, thereby securing the seat to the chassis in at least one from a plurality of positions.

8 Claims, 7 Drawing Sheets

CHILD VEHICLE SEAT

CROSS-REFERENCE TO RELATED APPLICATION(S)

This application is a United States Non-Provisional Patent Application that relies for priority on Netherlands Patent Application No. 1032957, filed on Nov. 29, 2006.

FIELD OF THE INVENTION

The invention relates to a child vehicle seat comprising a seat portion supported by a chassis, a backrest connected to said seat portion as well as means for placing the seat in at least two positions relative to the chassis, which means comprise at least two recesses as well as at least one element to be connected to said recesses, which element can be moved from a position in the recess to a position outside the recess, from which latter position the element can be moved to another recess, and vice versa.

DESCRIPTION OF THE RELATED ART

In such a child vehicle seat, which is known from German patent application DE-21.28.927, the chassis is provided with an elongated slot, which slot comprises two recesses. A pin connected to the seat portion is slidably accommodated in said slot. The seat portion is movable with respect to the chassis, as a result of which movement the pin can be brought into engagement with one of the recesses, for example.

The child can be moved from a seated position to a so-called sleeping position by changing the position of the seat portion relative to the chassis.

A drawback of this known child vehicle seat is that the pin can move out of engagement with the recess during use, for example when the vehicle drives over a bump, which may result in seat portion moving undesirably with respect to the chassis.

SUMMARY OF THE INVENTION

The object of the invention is to provide a child vehicle seat wherein the seat portion can be moved with respect to the chassis in a simple manner and wherein the seat portion is firmly connected to the chassis in a desired position.

This object is accomplished with the child vehicle seat according to the invention in that the element is movable within the recess from a position in which it is connected to said recess to a position in said recess in which it is disconnected from said recess.

In this way the element must first be moved within the recess itself in order to be disconnected therefrom before it can be moved out of the recess so as to be moved to another recess. In this way the seat portion cannot move undesirably with respect to the chassis.

Another embodiment of the child vehicle seat according to the invention is characterized in that the element is hook-shaped, while the recess is provided with a projecting edge, to which the hook-shaped element can be connected.

Such a hook-shaped element is easy to manufacture and can be readily connected in a simple manner to a projecting edge that bounds a recess.

Preferably, the element is held in the position in which it is connected to the recess also under the influence of, among other things, the force of gravity.

Yet another embodiment of the child vehicle seat according to the invention is characterized in that the chassis is provided with said recesses, while the seat portion is provided with said element.

Such a child vehicle seat is comparatively easy to manufacture.

Yet another embodiment of the child vehicle seat according to the invention is characterized in that the seat portion is provided with a pin, which is slidably accommodated in a slot formed in the chassis, or vice versa.

By using such a pin that is movable within a slot, an adequate guidance upon moving the seat portion with respect to the chassis is obtained. The element and the recesses merely function to define the various positions in that case.

Yet another embodiment of the child vehicle seat according to the invention is characterized in that the backrest is pivotally connected to the seat portion.

As a result, the backrest of the child vehicle seat can remain in abutment with the backrest of the vehicle seat when the element is being moved within the recess to the disconnected position from said recess and also when the element is being moved out of said recess. In addition, it can thus be ensured in a simple manner that the backrest of the child vehicle seat will at least in part abut against the backrest of the vehicle seat at all times, so that an adequate support of the child vehicle seat is ensured.

BRIEF DESCRIPTION OF THE DRAWINGS

The invention will now be explained in more detail with reference to the drawings, in which.

Like parts are indicated by the same numerals in the figures.

DETAILED DESCRIPTION OF THE INVENTION

Figure 1:
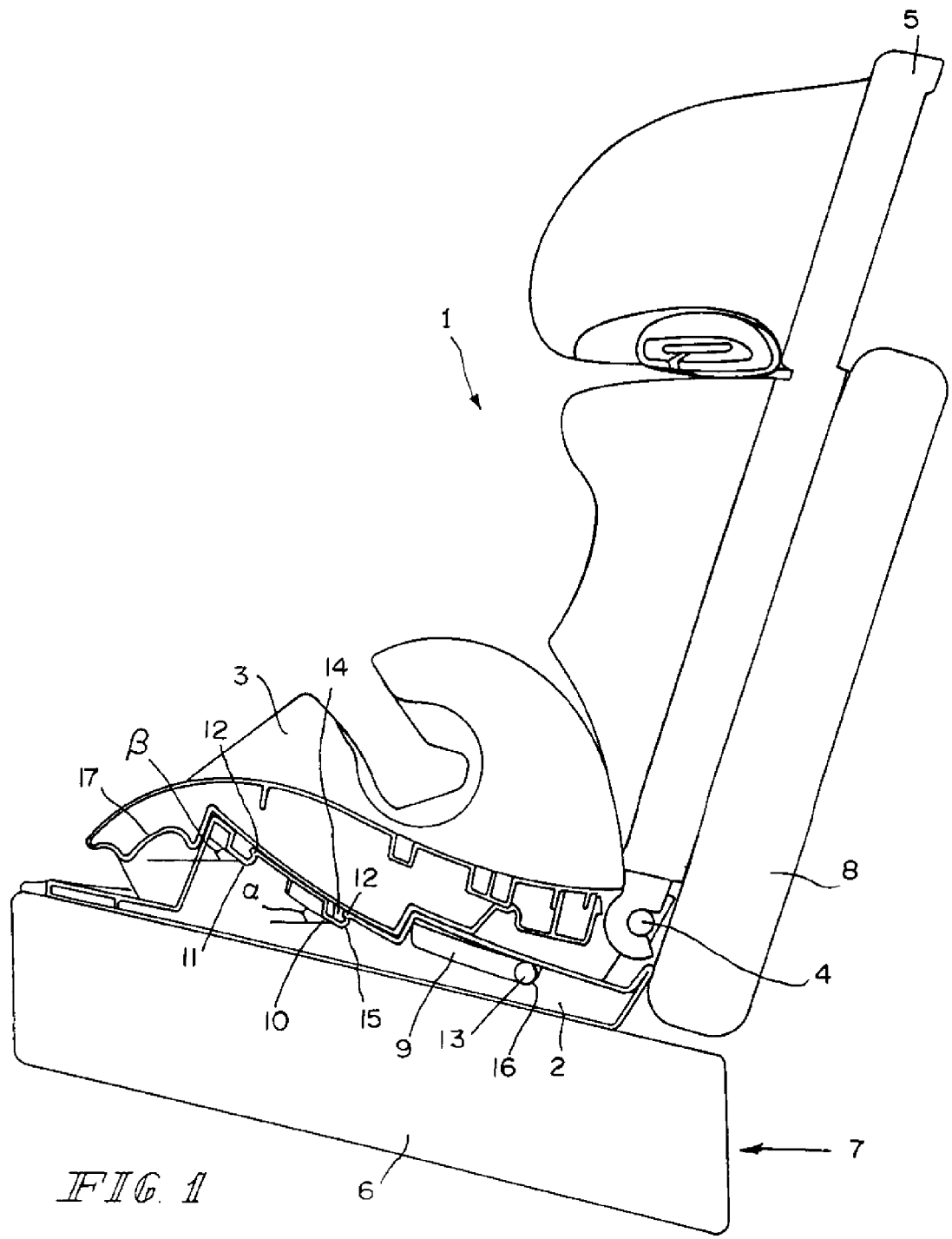
FIG. 1 is a side view of a child vehicle seat according to the invention, in which an element is shown in a position in which it is connected to a first recess.

FIG. 1 shows a child vehicle seat 1 according to the invention, which comprises a seat portion 3 supported by a chassis 2 and a backrest 5 which is pivotally connected to the seat portion 3 about a pivot pin 4. In use, the chassis 2 is supported on a seat portion 6 of a vehicle seat 7, while the backrest 5 abuts against a backrest 8 of the vehicle seat 7.

The chassis 2 is provided with an elongated slot 9 and two recesses 10, 11, which are each bounded by a projecting edge 12 on a side facing towards the backrest 5. The seat portion 3 is provided with a pin 13, which is movable within a slot 9, as well as with a hook-shaped element 14. The hook-shaped element 14 is provided with a projection 15. In the position of the seat portion 3 with respect to the chassis 2 that is shown in FIG. 1, the pin 13 abuts against an end 16 of the slot 9. The hook-shaped element 14 is located in the first recess 10, with the projection 15 being located under the projecting edge 12. The hook-shaped element 14 is thus connected to the recess 10. Moreover, since the recesses 10, 11 as well as the associated projecting edges 12 extend at an acute angle α and β, respectively, to the horizontal, the hook-shaped element 14 is firmly pressed down in the connected position under the influence of the force of gravity exerted by the seat portion 3 and a child seated thereon.

Figure 2:
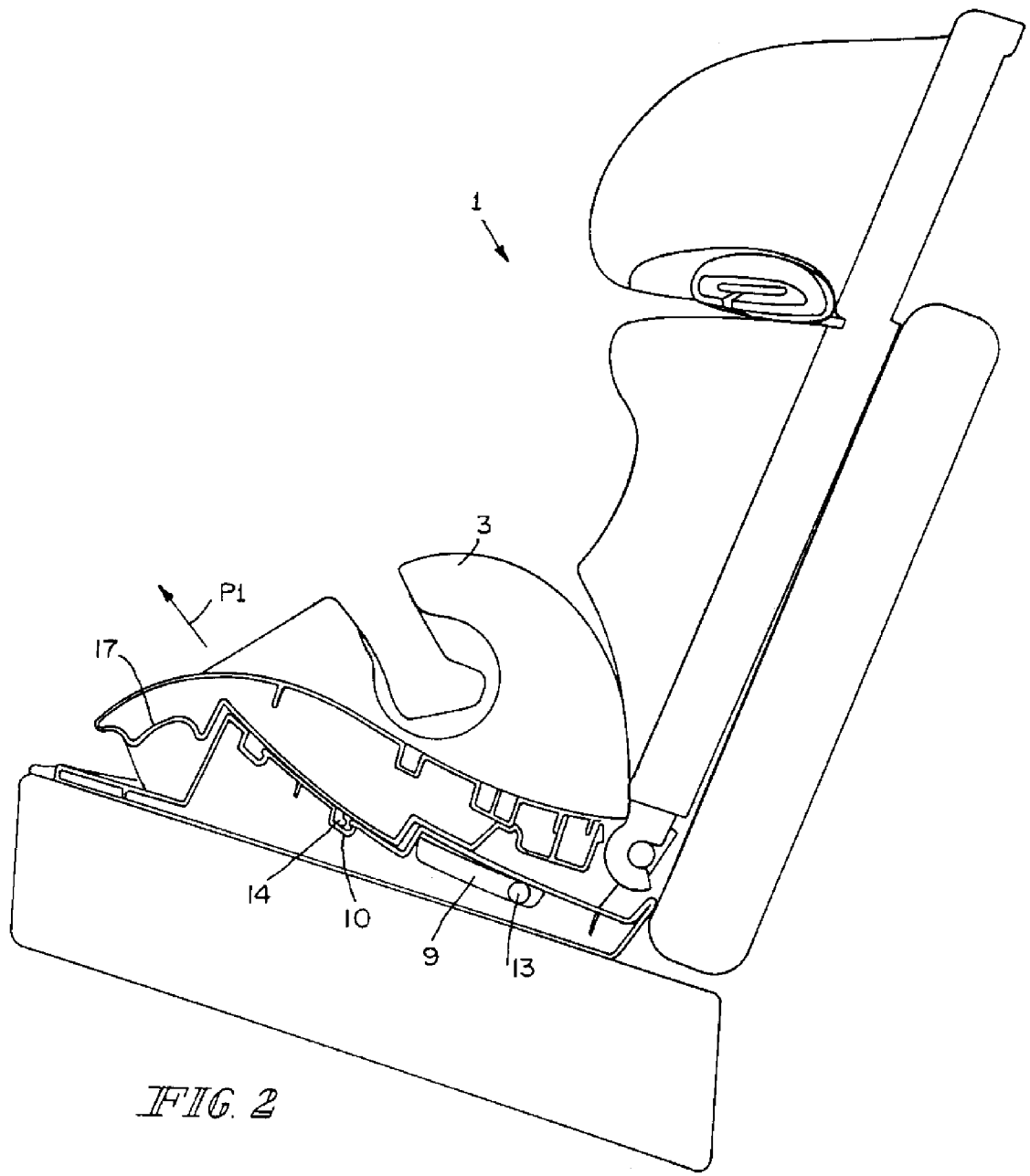
FIG. 2 is a view of the child vehicle seat shown in FIG. 1, in which the element is shown in a position in the first recess in which it is disconnected from said recess.
Figure 7:
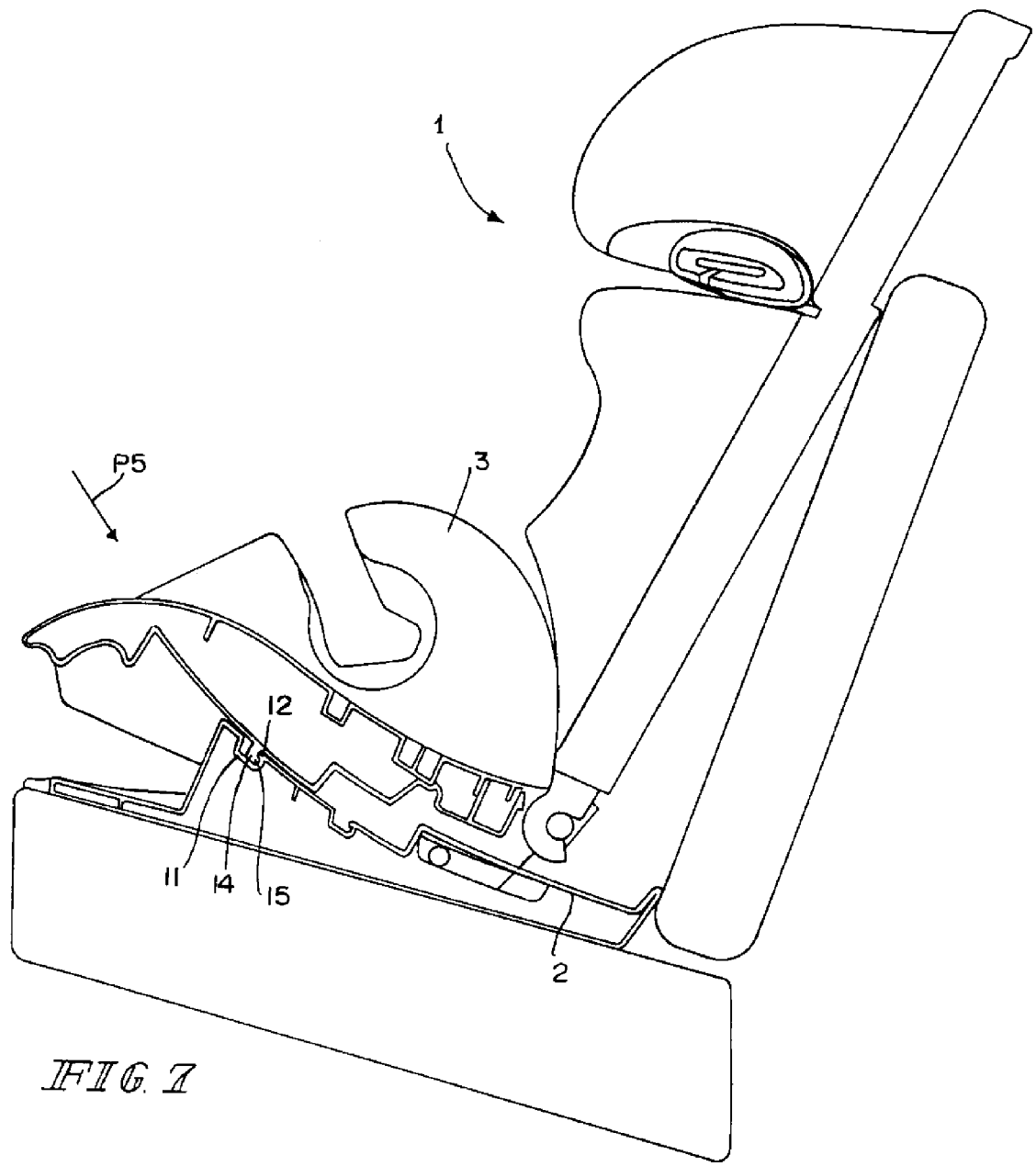
FIG. 7 is a view of the child vehicle seat shown in FIG. 1, in which the element is shown in a position in which it is connected to the second recess.

When a user wishes to move the child vehicle seat to a more reclined position or sleeping position, as shown in FIG. 7, the user can take hold of the seat portion 3, for example by a grip-like recess 17, and move it in the direction indicated by the arrow P1 (FIG. 2). This causes the pin 13 to move within the slot 9, whilst the hook-shaped element 14 is moved from the position in which it is connected to the recess 10 to the position in said recess 10 in which it is disconnected from said recess.

Figure 3:
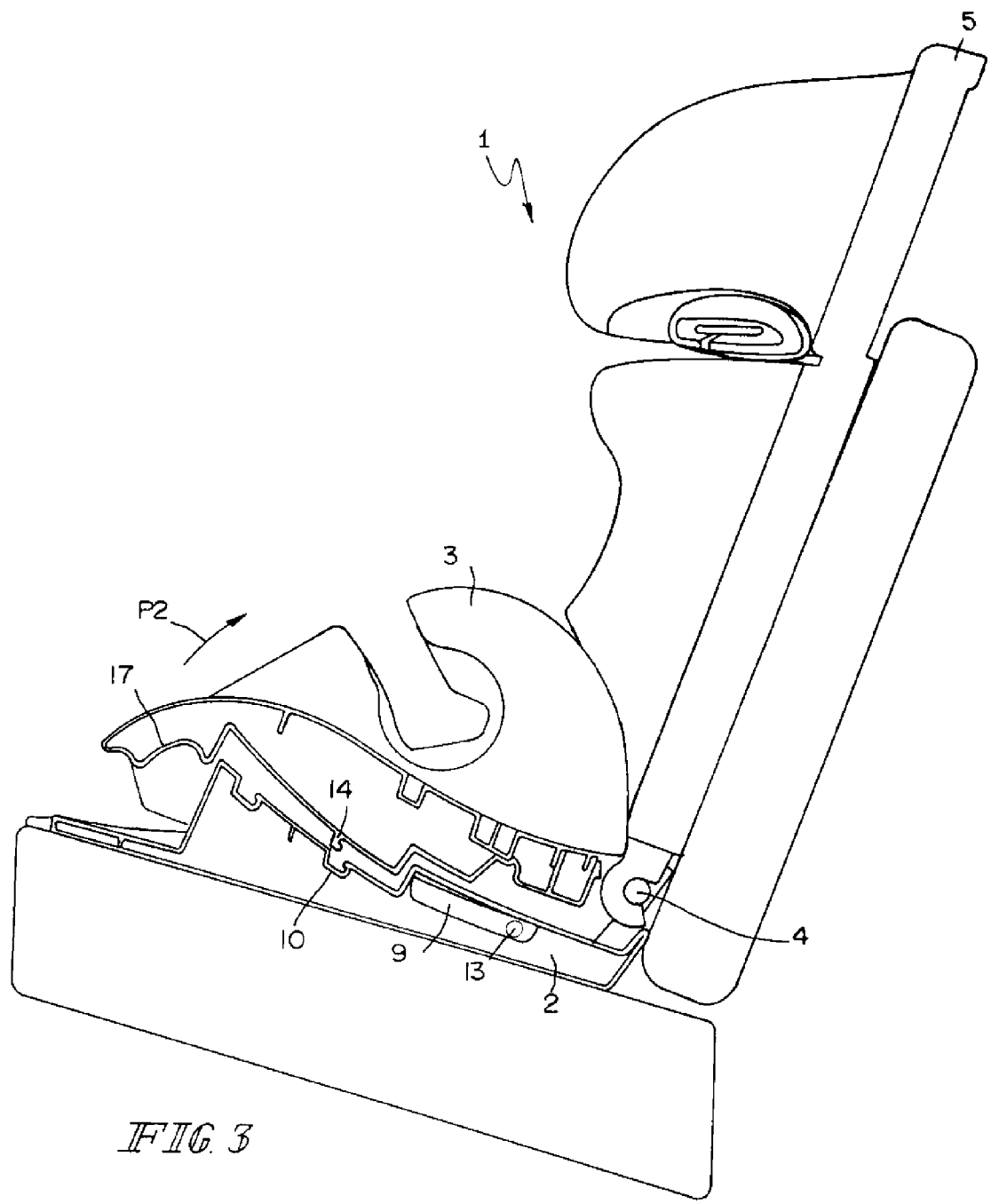
FIG. 3 is a view of the child vehicle seat shown in FIG. 1, in which the element is shown in a position outside the first recess.
Figure 4:
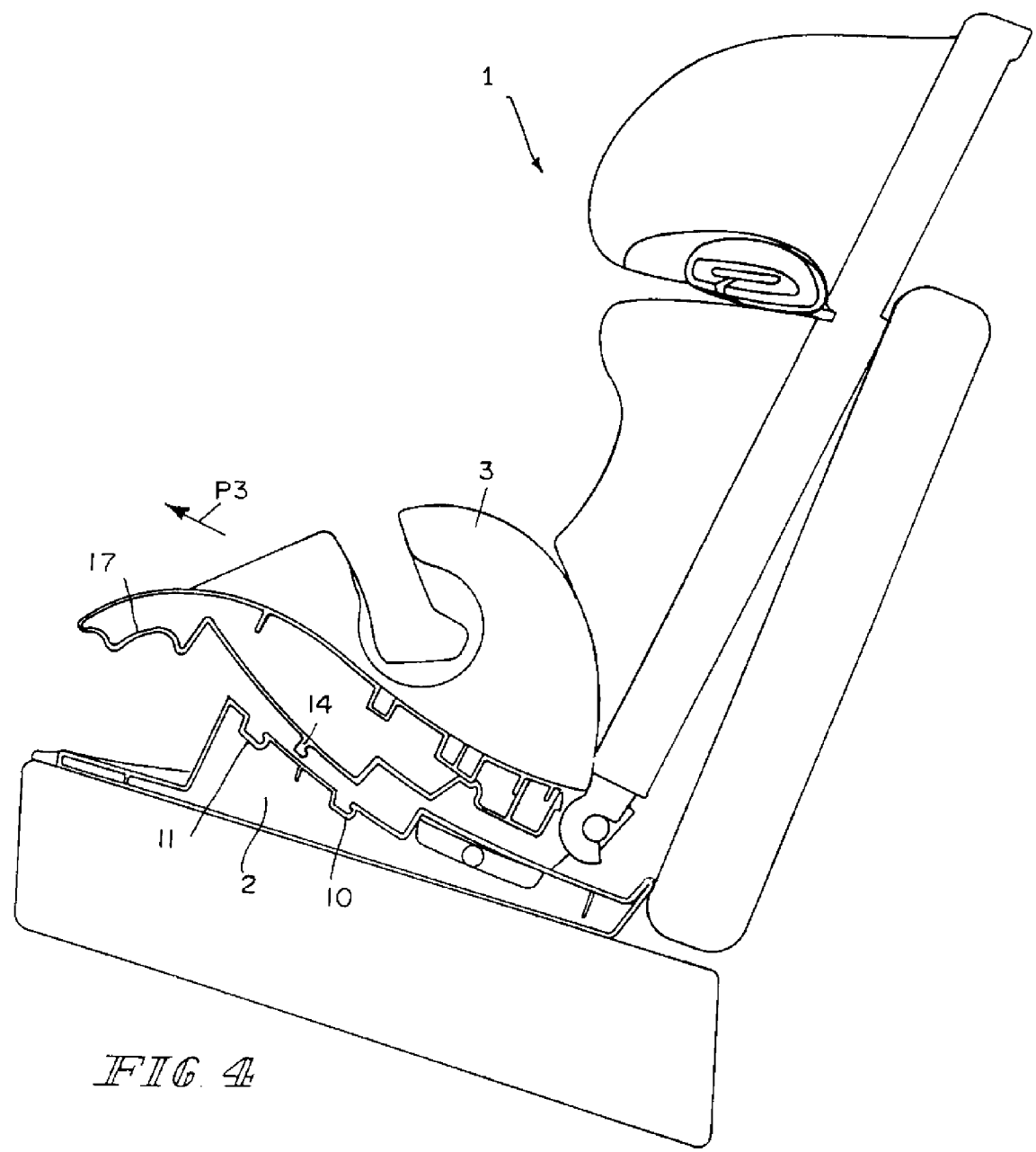
FIG. 4 is a view of the child vehicle seat shown in FIG. 1, in which the element is shown in a position between the first and the second recess.

The user will then the pivot the seat portion 3 in the direction indicated by the arrow P2 (see FIG. 3), with the pin 13 functioning as a pivot. At the same time the seat portion 3 will also pivot about the pivot pin 4 with respect to the backrest 5. During pivoting of the seat portion 3 with respect to the chassis 2, the hook-shaped element 14 is moved to a position outside the recess 10. Following that, the user will move the seat portion 3 in the direction indicated by the arrow P3, causing the projection 14 to move towards the second recess 11 (see FIG. 4).

Figure 5:
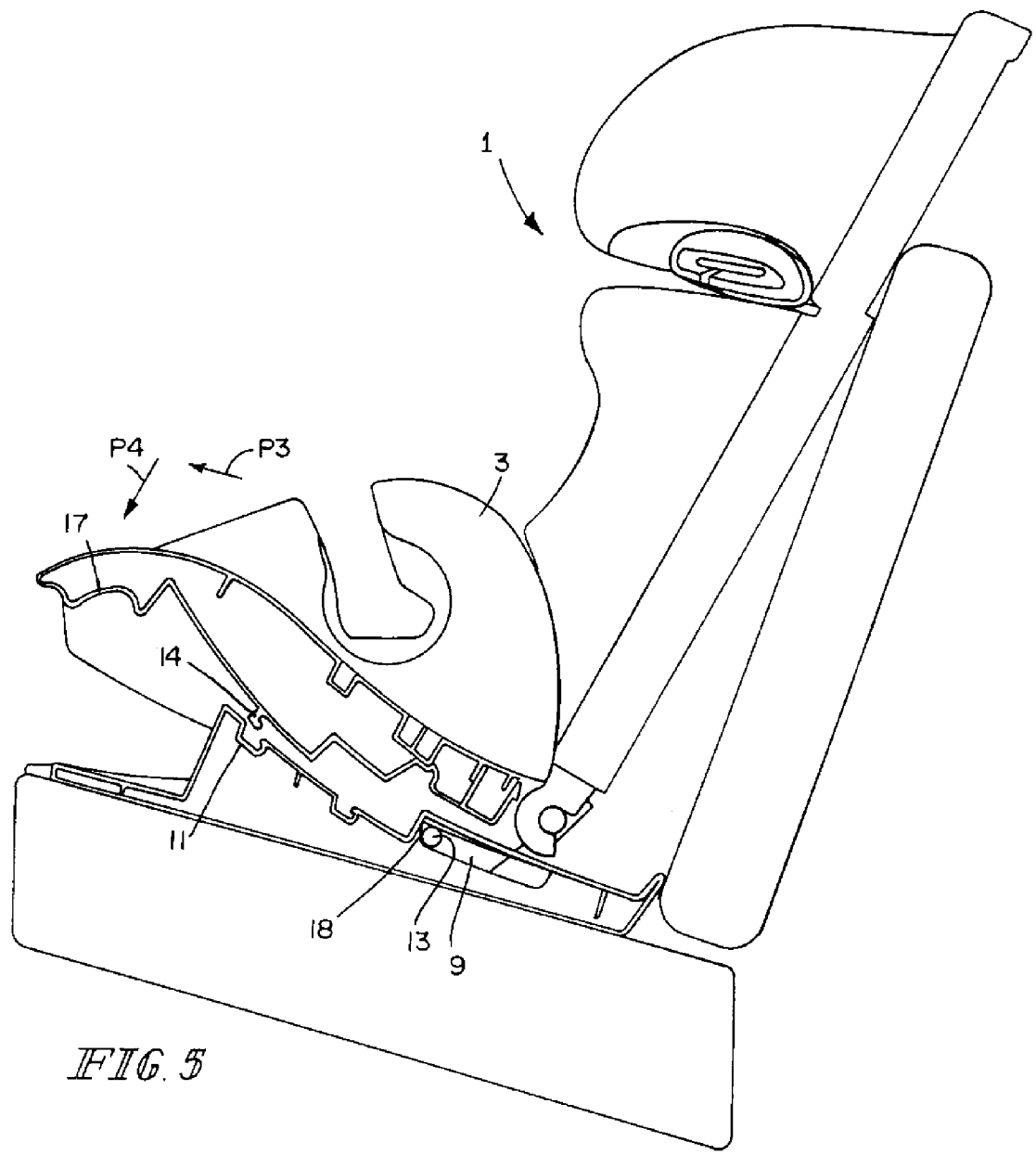
FIG. 5 is a view of the child vehicle seat shown in FIG. 1, in which the element is shown in a position located outside the second recess.
Figure 6:
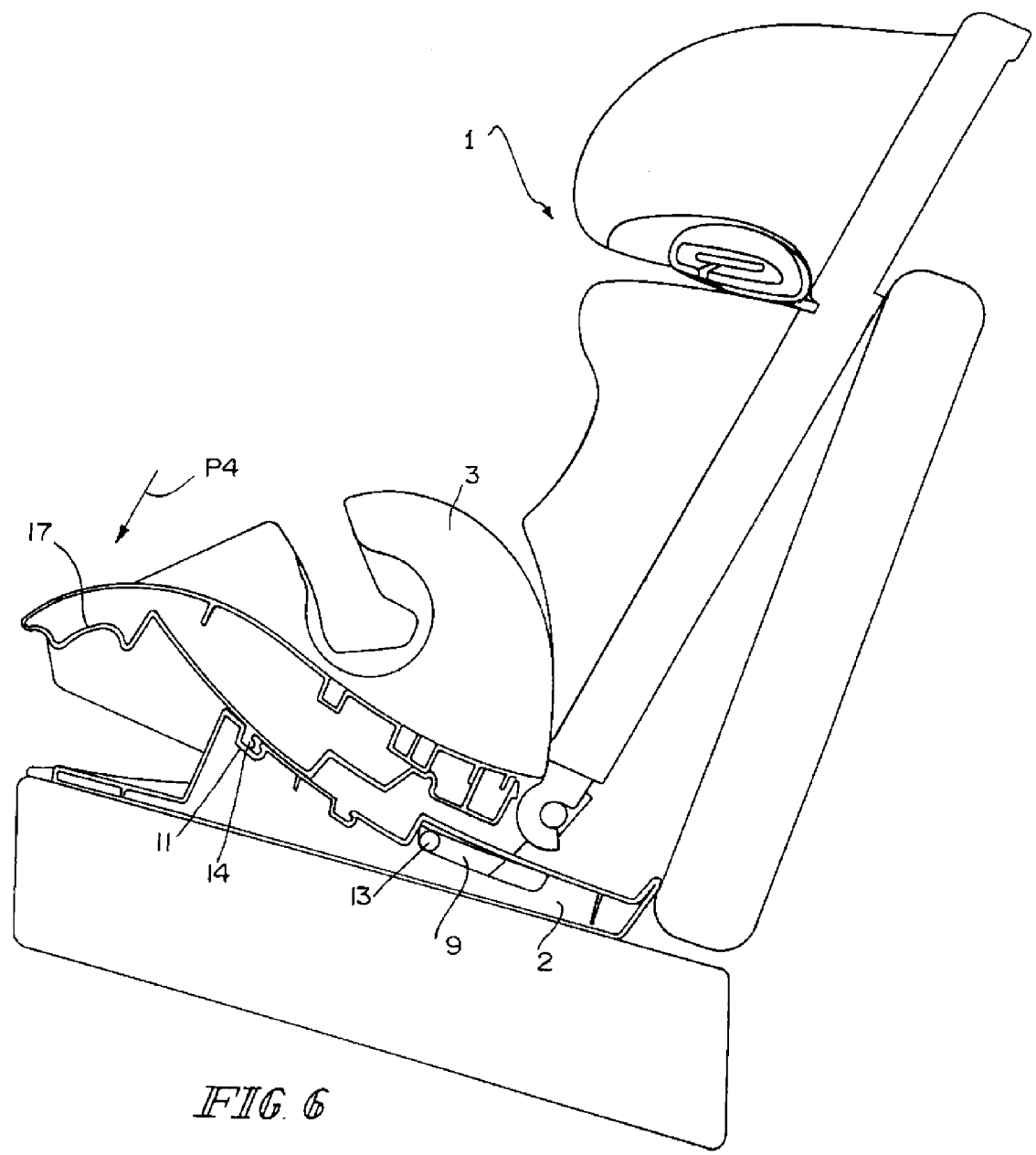
FIG. 6 is a view of the child vehicle seat shown in FIG. 1, in which the element is shown in a position in the second recess in which it is disconnected from said recess.

Once the projection 14 takes up a position above the second recess 11 (FIG. 5), further movement in the direction indicated by the arrow P3 is prevented in that the pin 13 abuts against a second end 18 of the slot 9. The user will then pivot the seat portion 3 in the direction indicated by the arrow P4, causing the hook-shaped element 14 to move into the second recess 11 (see FIG. 6). In this position, the hook-shaped element is not connected to the second recess 11 yet. In order to achieve this, the seat portion 3 is moved in a direction indicated by the arrow P5, opposite the direction indicated by the arrow P1. This can be done by the user. When the user releases the seat portion 3 in the position shown in FIG. 6, the movement of the seat portion 3 in the direction indicated by the arrow P5 will take place automatically under the influence of the force of gravity. By moving the seat portion 3 in the direction indicated by the arrow P5, the hook-shaped element 14 is connected to the projecting edge 12 by the projection 15.

It is of course also possible to provide the chassis 2 with more than two recesses, thereby making it possible to realize a corresponding number of different positions of the seat portion 3 relative to the chassis 2.

What is claimed is:

1. A child vehicle seat, comprising:
   a seat portion having a bottom surface;
   a chassis supporting the seat portion on a top surface;
   a backrest connected to the seat portion;
   a pivot connecting the backrest to the seat portion to permit the backrest to be pivotally adjusted with respect to the seat portion;
   at least one element disposed on one of the bottom surface of the seat portion or the top surface of the chassis; and
   at least two recesses defined in one of the top surface of the chassis or the bottom surface of the seat portion,
   wherein the at least one element engages one of the at least two recesses, thereby securing the seat to the chassis in one from at least two positions,
   wherein the at least two recesses comprise a first recess and a second recess, the first recess defining a first reclined position for the backrest when the at least one element engages the first recess, and the second recess defining a second reclined position for the backrest when the at least one element engages the second recess,
   wherein the first recess is defined by a first projecting edge, angled at a first angle with respect to horizontal, and the second recess is defined by a second projecting edge, angled at a second angle with respect to horizontal, and
   wherein the first angle is not equal to the second angle.

2. The child vehicle seat of claim 1, wherein the at least one element is hook-shaped and the at least two recesses are each defined by a projecting edge engageable by the at least one element.

3. The child vehicle seat of claim 2, wherein the at least one element comprises a projection that engages beneath the projecting edge.

4. The child vehicle seat of claim 1, wherein the at least one element is disposed on the seat portion and the at least two recesses are defined by the chassis.

5. The child vehicle seat of claim 1, further comprising a pin disposed on the seat portion, wherein the pin slidably engages a slot in the chassis.

6. The child vehicle seat of claim 1, further comprising a grippable recess on the bottom surface of the seat portion to assist at least with disengagement of the at least one element from one of the at least two recesses.

7. The child vehicle seat of claim 1, wherein the bottom surface of the seat portion and the top surface of the chassis define complimentary shapes so that the bottom surface and the top surface engage one another when the seat is disposed on the chassis.

8. The child vehicle seat of claim 1, wherein the seat engages the chassis under at least the force of gravity.

\* \* \* \* \*